United States Patent [19]

Pemberton

[11] 4,006,346
[45] Feb. 1, 1977

[54] CONTROL METHOD INCLUDING FEEDFORWARD SIGNAL

[75] Inventor: Troy J. Pemberton, Bartlesville, Okla.

[73] Assignee: Phillips Petroleum Company, Bartlesville, Okla.

[22] Filed: Nov. 13, 1975

[21] Appl. No.: 631,580

[52] U.S. Cl. .............................. 235/150.1; 526/59; 526/61
[51] Int. Cl.² ........................................ G05D 07/06
[58] Field of Search ................................ 235/150.1

[56] References Cited
UNITED STATES PATENTS 3,552,428  1/1971  Pemberton .................. 137/486

OTHER PUBLICATIONS

"Feedforward Control" in *Techniques of Process Control*, by Buckley, published by John Wiley & Sons, Inc., 1964, pp. 70–73.

Primary Examiner—Eugene G. Botz

[57] ABSTRACT

A control method wherein the control signal is generated from a disturbance signal, the functional relationship between these signals being an equation based on two dead times and a first order lag and a first order lead, the ratio of the time constants of this equation being equal to the fourth power of the ratio of the time constants of the disturbance dynamics and of the control dynamics of the process to be controlled.

5 Claims, 10 Drawing Figures

CONTROL METHOD INCLUDING FEEDFORWARD SIGNAL

This invention relates to control methods. More specifically, this invention relates to a method wherein at least one parameter of a process is influenced by a disturbance variable and by a control operation and wherein the control operation is carried out responsive to the disturbance variable.

BACKGROUND OF THE INVENTION

Various chemical and physical processes, e.g. polymerization processes, petroleum cracking processes, heat exchange processes, etc., can be automatized by controlling one or more parameters of these processes. Generally speaking, in a control method a disturbance variable is sensed and responsive thereto a manipulated variable is regulated such as to reach a desired behavior of a process parameter. In most instances, it is desirable to keep a certain process parameter, e.g. a temperature or a conversion rate, constant.

The control systems and methods can essentially be divided into two groups. The first group, the feedback controls, are methods in which a control signal is generated after the parameter of the process which is to be controlled shows a deviation from the function or value this parameter is supposed to have. The second group, the feedforward controls, are methods in which variables of a process are sensed before they become effective on the parameter to be controlled and a control operation is taken to prevent a deviation of the parameter from the value. Modern control systems and methods combine both the feedback and the feedforward control to obtain more accurate results.

Every control method starts from a given process and a model or functional relationship by which responsive to every disturbance variable change a certain control operation is carried out. Thus, the process and the control method are connected. However, the functional relationship has to be determined separately for every process. In addition, once this functional relationship is established, it is generally impossible to further improve the control method without either establishing a completely new functional relationship or operating with additional control methods. It would thus be highly desirable to have a control method available that can be applied to a wide variety of processes and in which only the constants of the functional relationship mentioned differ, in which these constants, however, are defined by a few constants of the process dynamics.

THE INVENTION

It is thus one object of this invention to provide a new control method.

Another object of this invention is to provide a method for controlling a process parameter wherein a disturbance variable and a control operation influence this parameter.

Still another object of this invention is to provide a control method which is essentially defined by one functional relationship between the disturbance variable and a control signal for a variety of processes to be controlled wherein the constants involved in said functional relationship are defined by a few process dynamics constants which can be easily determined or are already well known.

BRIEF DESCRIPTION OF THE DRAWING

These and other objects, advantages, embodiments, features and details of this invention will become apparent from the following description when considered in connection with the accompanying drawing, in which.

In accordance with this invention, I have now found a method for controlling a parameter of a chemical or physical process which parameter is influenced by a disturbance variable and by a manipulated variable, which control method comprises automatically measuring said disturbance variable, automatically generating a disturbance signal ($ds$) as a function of the time corresponding to said disturbance variable as measured, converting said disturbance signal ($ds$) in a computer into a control signal ($cs$) which is related to the disturbance signal ($ds$) by the control equation $$cs(L) = \frac{K_1}{K_2} \cdot \frac{T_2 \cdot L + 1}{T_1 \cdot L + 1} \cdot e - (D_d - D_c) \cdot L \cdot ds$$

wherein $K_1$ is the steady state gain of the process parameter caused by the unit change of the disturbance variable, $K_2$ is the steady state gain of the process parameter caused by the unit change of the manipulated variable, $D_d$ is the dead time of the disturbance dynamics, $D_c$ is the dead time of the control dynamics, $L$ is the Laplace transform operator, and $T_1$ and $T_2$ are defined by the following equations:

If $T_d > T_c$:  1)

$T_2 = 0.4 T_d$;

$T_1 = 0.4 T_d \cdot \left(\dfrac{T_c}{T_d}\right)^4$;

If $T_c > T_d$:  2)

$T_2 = \dfrac{1.1 \, (T_c - T_d)}{\left(\dfrac{T_c}{T_d}\right)^4 - 1}$;

$T_1 = \dfrac{1.1 \left(\dfrac{T_c}{T_d}\right)^4 (T_c - T_d)}{\left(\dfrac{T_c}{T_d}\right)^4 - 1}$;

If $T_c = T_d$,  3)

$T_1 = T_2 = T_c = T_d$, $T_c$ being the time constant of the control dynamics and $T_d$ being the time constant of the disturbance dynamics, with the further provision that either $D_d = D_c$
or $T_c = T_d$;
and automatically converting said feedforward control signal ($cs$) into a corresponding control operation influencing the manipulated variable and thereby the process parameter. The definition of the process time constants, namely, $D_d$, $D_c$, $T_c$ and $T_d$, are given later in connection with FIG. 2.

In accordance with a preferred embodiment of this invention, the measured disturbance variable is converted into an electrical disturbance signal and this electrical disturbance signal is filtered and thereafter converted into said control signal. This filtering operation has the advantage that the control system is not influenced by strong but very short disturbances. Particularly in chemical processes, such disturbances do not occur often and because of the generally large masses involved, on the one hand, cannot be controlled and, on the other hand, do not overly affect the results. This filtering operation is preferably carried out by passing the electrical disturbance signal through a filter for removing all components having a frequency greater than an upper limit frequency.

A further embodiment of this invention provides for carrying out the method of the invention in an analog circuit. In accordance with an electrical version of this embodiment, the disturbance signal is an electrical signal and essentially a direct current signal and is passed via an input resistor having the resistance $R_i$ and via a capacitor in parallel to this resistor having the capacitance $C_i$ to the inverting input of an operational amplifier, the output of which is connected to the inverting input via a feedback resistor having the resistance $R_b$ and in parallel to this resistor via a feedback capacitor having the capacitance $C_b$, thus resulting in an output signal at the output of the operational amplifier corresponding essentially to the control signal cs wherein the resistances and capacitances are selected such as to comply with the equations $$R_i C_i = T_2$$

$$R_b C_b = T_1$$

$$\frac{R_i}{R_b} = \frac{K_1}{K_2}$$

wherein $R_i$ and $R_b$ are measured in ohms, $C_i$ and $C_b$ are measured in farads and $T_2$ and $T_1$ are the time constants of the control equation in seconds. If the ratio of the resistances equals the ratio of the gain constants $K_1$ and $K_2$, the output signal of the operational amplifier is the control signal. However, it is, of course, possible to pass the output signal received by the operational amplifier just described through a further circuit in order to change the absolute value thereof. It is presently preferred to have both resistances and both capacitances adjustable so that the same analog circuit can be used for a wide variety of process controls and only the resistances and capacitances have to be adjusted such as to meet the specific process dynamics in accordance with the relationship given above.

In many instances a feedback control constitutes a proper means of fine control. It is, therefore, in accordance with a further embodiment of this invention, presently preferred to measure the parameter of the process to be controlled or a feature influenced by this parameter, to generate a corresponding feedback control signal and to linearly combine the feedback control signal and the feedforward control signal automatically such as to produce a control signal in accordance with which a control operation is automatically carried out. By linearly combining the feedforward and the feedback control signals, any operation such as adding or subtracting, with or without multiplying each of these signals with the same or different constant, is meant.

The process which is controlled in accordance with the method of this invention can be any process involving at least two variables, one of which is at least measurable and the other is adjustable and can be manipulated. Both features have to influence the parameter of the process which is to be controlled. The measurable variable or disturbance variable can be one which in fact cannot be controlled (e.g., the outside temperature or the humidity), or this disturbance variable can be one that can be controlled but, for instance for economical reasons, is not controlled. An example for the latter would be a feedstream composition, the flow rate or a production rate. The manipulated variable can be any of the process variables that influences the parameter to be kept constant. Examples for such adjustable variables are flow rates of fluids, gases, solids, mechanical movement, heat addition, power input, strength of irradiation, etc. The parameter that is to be controlled in accordance with the method of this invention can be any process parameter such as the temperature, the level of reactants, the pressure, the composition of a product, the boiling point, viscosity, the molecular weight, the yield, etc.

The time constants and dead times of the process to be controlled can vary in very broad ranges. Time constants and dead times of about a few seconds up to several minutes can occur and the method of this invention can operate with such values.

The invention will be more fully understood by a person skilled in the art from the following description of the drawings, and further preferred embodiments of this invention will become apparent therefrom.

Figure 1:
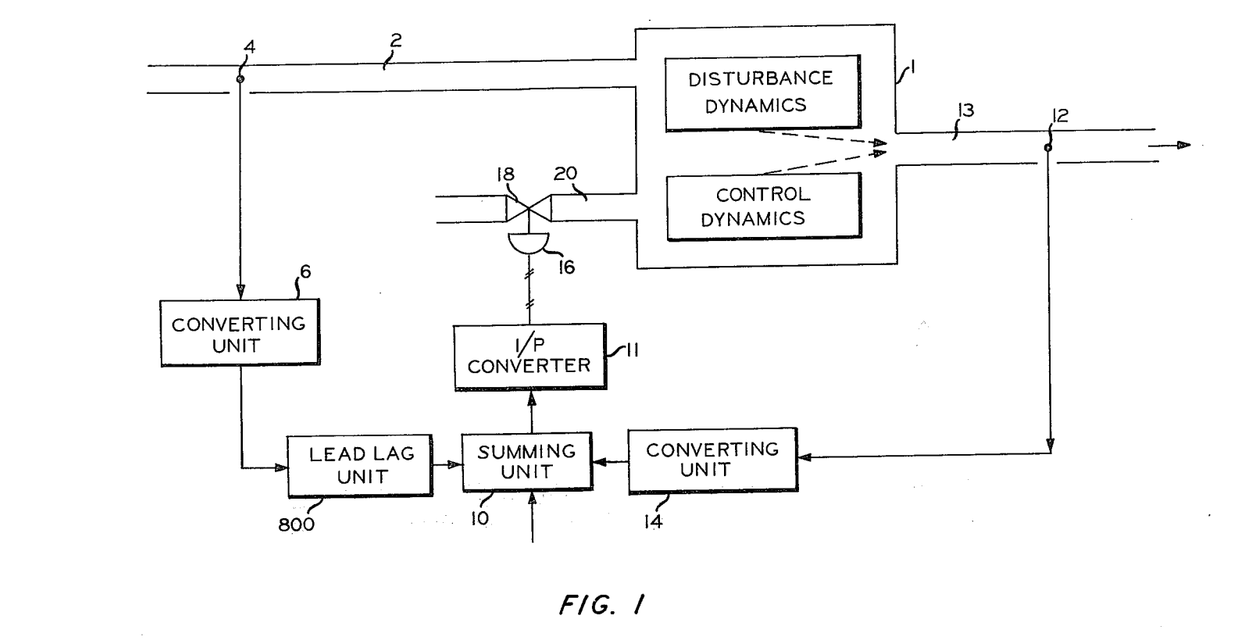
FIG. 1 shows schematically a system of a process and the control thereof.

FIG. 1 shows schematically the control of this invention. The process to be controlled is carried out in unit 1. An uncontrolled, although not necessarily uncontrollable, first input variable 2 influences at least one parameter of the process which is to be controlled. Examples for such measurable but not controlled variables, i.e., disturbance variables, are the feed flow rate of a fractionator, the production rate of an exothermic process, the catalyst composition, the humidity of solids to be dried, etc.

The first input variable 2 is measured with a measuring head 4. The output of this measuring head 4, if necessary, can be connected to a converting unit 6. In this unit the measured disturbance variable is converted into a signal which is introduced into the input of a lead lag unit 800. This converting unit 6 can, for instance, be a P/I converter producing an electrical signal from a pneumatic signal. The converting unit 6 can also contain elements such as condensers to smooth the received measured variable in case this measured disturbance variable should have changes that are too extreme to be utilized by the downstream control equipment.

In the lead lag unit 800 the received signal is transformed, as will be described in detail, into a feedforward control signal. The output voltage of the lead lag unit 800 is related to the input voltage thereof essentially in accordance with the control equation given above.

The output of the lead lag unit 800 is connected to the first of two inputs of a summing unit 10. In case no feedback control is used, this output from the lead lag unit 800 can also be used directly for control purposes.

In the preferred embodiment of this invention a feedback control is provided for. A process variable 13 is measured in sensing unit 12. The variable measured can be the parameter to be controlled, for instance the temperature of the process or the production rate. In any event, this variable is at least directly influenced by the parameter to be controlled. The value measured in the sensing unit 12 is converted into a feedback signal in a converting unit 14 which includes e.g. a proportional integral controller. The output of this unit 14 is connected to the second input of the adding unit 10. The output of the adding unit 10 can be connected via an I/P converter 11 to a control unit 16. This control unit converts the control signal from the adding unit 10 into a control action. This control action can, for instance, close or open valve 18.

The control signal from the adding unit 10 thus manipulates a second input variable 20 of the process 1 via which the output variable 13 of the process can be controlled. This second input variable can, for instance, be the circulation rate or temperature of a heat exchange medium, the fuel supply, the fuel pressure, the feed rate of a blending compound, the pH of an additive, etc. The uncontrolled but measurable disturbance variable 2 influences the process parameter to be controlled in accordance with disturbance dynamics whereas the adjustable control variable 20 which is used to control the process parameter influences this process parameter in accordance with control dynamics. In practically all feedforward controls the disturbance dynamics and the control dynamics are different. In other words, a change of the measured variable 2 of the process influences the process parameter which is to be controlled earlier or later, and faster or slower, than a change of the manipulated variable 20 does.

The four essential time values of the process to be controlled and the gain values from which the constants involved in the controlled function in accordance with this invention are calculated, are explained in more detail in connection with FIGS. 2a to d.

Figure 2A:
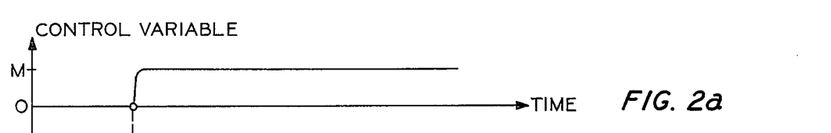
FIGS. 2a, b, c and d show diagrams for the dynamic behavior of a process illustrated in FIG. 1.
Figure 2B:
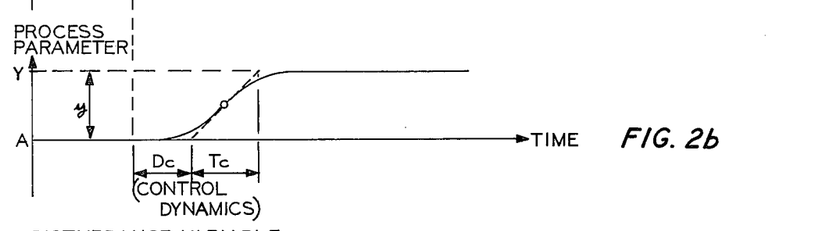
Figure 2C:
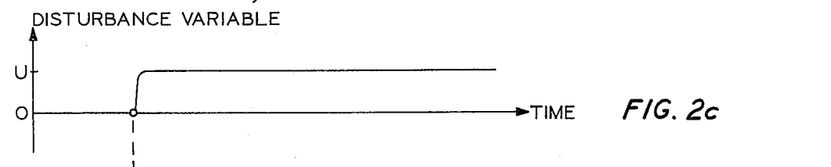
Figure 2D:
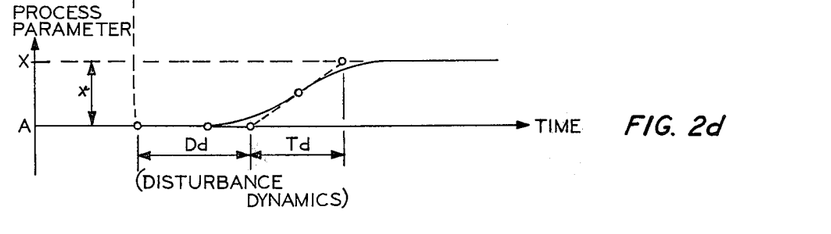

FIG. 2a shows a change of the control or adjustable or manipulated variable 20 approximately in a step function from an original value which, for simplicity, is assumed to be zero to a value M. The control dynamics are defined by the change of the process parameter represented by the process variable 13 responsive to such a step change in the control variable 20. This response of the process variable is shown in FIG. 2b. Correspondingly, FIG. 2c shows a change of the disturbance variable from an original value, which again for simplicity reasons is assumed to be zero to a value U. The The disturbance variable also is assumed to be approximately a step function. Responsive to this step change of the disturbance variable 2, the process parameter changes from a value A to a value X as shown in FIG. 2d. The dynamics involved in this change are called disturbance dynamics.

The control method of this invention is based on the following conditions:

a. Responsive to a step change of the disturbance variable or of the adjustable variable, the process parameter changes as a function of time from its original value in a smooth curve having one inclination or inflection point to a new value. The process parameter is steadily at the original value before the step change and is steadily at the new value after the conclusion of the transient effects of the step change.

b. Regardless of the real functional relationship between the control variable and the parameter and the disturbance variable and the parameter, the control equation is based on a simulation of a lag plus dead time both for the disturbance dynamics and for the control dynamics.

The dead times $D_c$ and $D_d$ and the time constants $T_c$ and $T_d$ for the control dynamics and for disturbance dynamics are defined and determined as shown in FIGS. 2a, 2b, 2c and 2d. As shown in FIG. 2b and FIG. 2d, a tangent is drawn through the process parameter-time-function in the inflection point thereof. The time between the beginning of the respective step function and the point where this tangent in the inclinaton point of the corresponding parameter-time-function intersects the time axis or hits the original value of the process parameter is the dead time $D_d$ or $D_c$, respectively. The time between the point where said tangent intersects the time axis or hits the original value of the process parameter and the point where this tangent hits the new value or asymptotic value X or Y, respectively, is called the time constant $T_c$ or $T_d$, respectively. The time constants $T_c$ or $T_d$ can also be expressed by the equations $$T_d = x \left(\frac{dp}{dt}\right)_{inflection}$$

$$T_c = y \left(\frac{dp}{dt}\right)_{inflection}$$

in which $T_c$ and $T_d$ are the time constants for the control dynamics and the disturbance dynamics, respectively, $x$ and $y$ are the steady state or asymptotic changes of the process parameter $p$ caused by the unit step change of the disturbance variable or the unit step change of the control variable, respectively, and $$\left(\frac{dp}{dt}\right)_{inflection}$$

is the slope of the tangent to the function $p(t)$ of the process parameter at the inflection point. This inflection point is defined usually as the solution of the equation $$\frac{d^2p}{dt^2} = o.$$

The inflection point can also be determined geometrically and by approximation.

Thus, the four time values, namely, the dead times $D_d$ and $D_c$ and the time constants $T_c$ and $T_d$, can be readily determined either graphically or by calculation and, in many instances, are known for the given process to be controlled. From these values the time constants for the control equation $T_1$ and $T_2$ can be readily determined in accordance with the definition given above. Surprisingly, in accordance with this invention, it has been found that these time constants $T_2$ and $T_1$ are related to the time constants $T_c$ and $T_d$ of the process by the simple relationship $$\frac{T_2}{T_1} = \left(\frac{T_c}{T_d}\right)^4$$

This result will be shown and discussed in more detail in connection with the examples.

The gain value $K_2$ for the control dynamics is given by the equation $$K_2 = y/M$$

and correspondingly the gain value $K_1$ for the disturbance dynamics is given by the equation $$K_1 = x/U$$

wherein $x$ and $y$ are the steady state or asymptotic changes in the process parameter caused by a control feature step change of M or by a disturbance feature step change of U, respectively.

Since the control method as indicated is an approximation, it is within the scope of this invention further to tune the control by minor changes in $T_2$ and $T_1$. However, the control method of this invention in very many instances is optimal already and does not even need fine tuning.

Figure 3A:
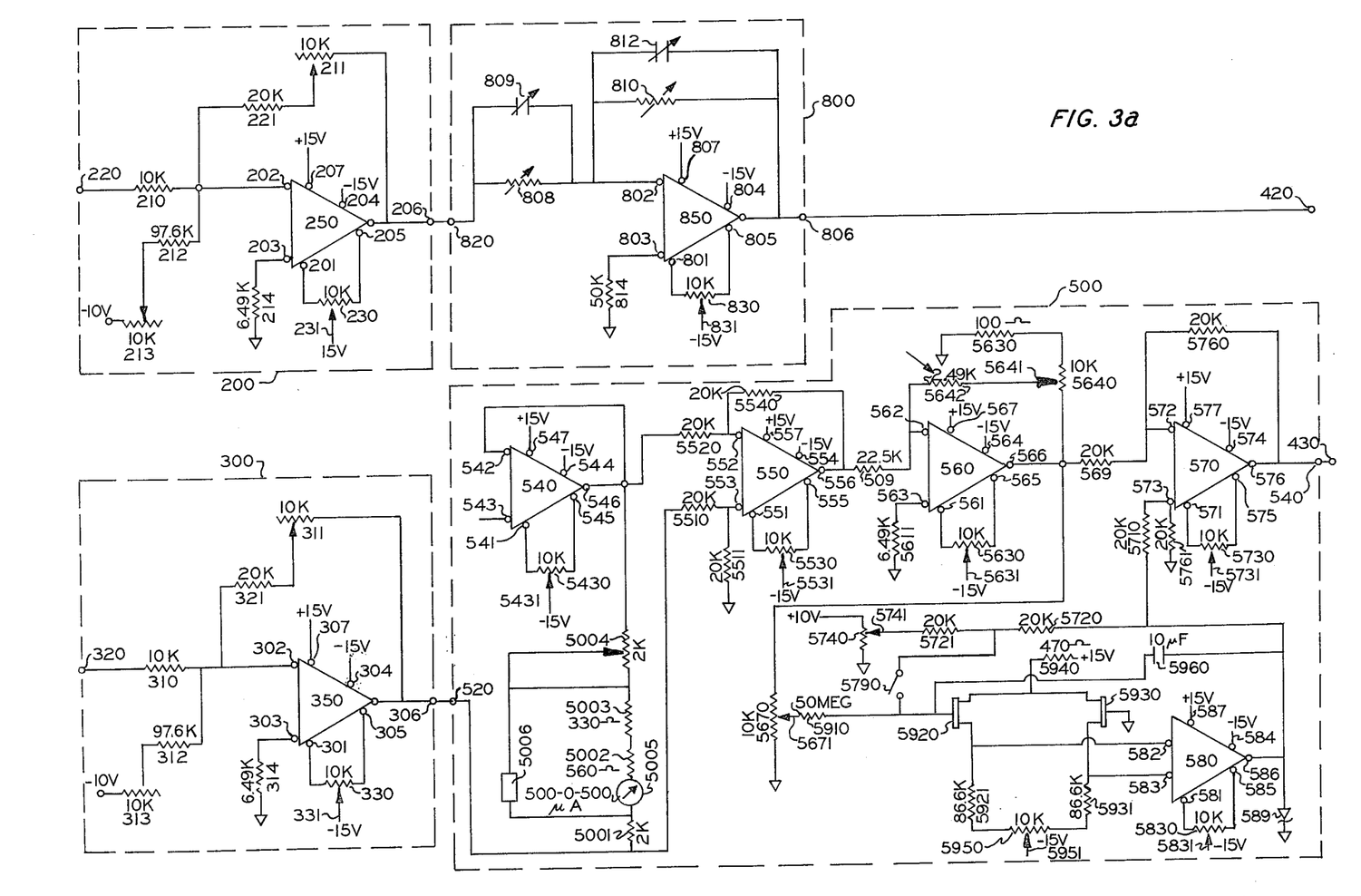
FIGS. 3a and b show an analog control circuit for a feedback and feedforward control.
Figure 3B:
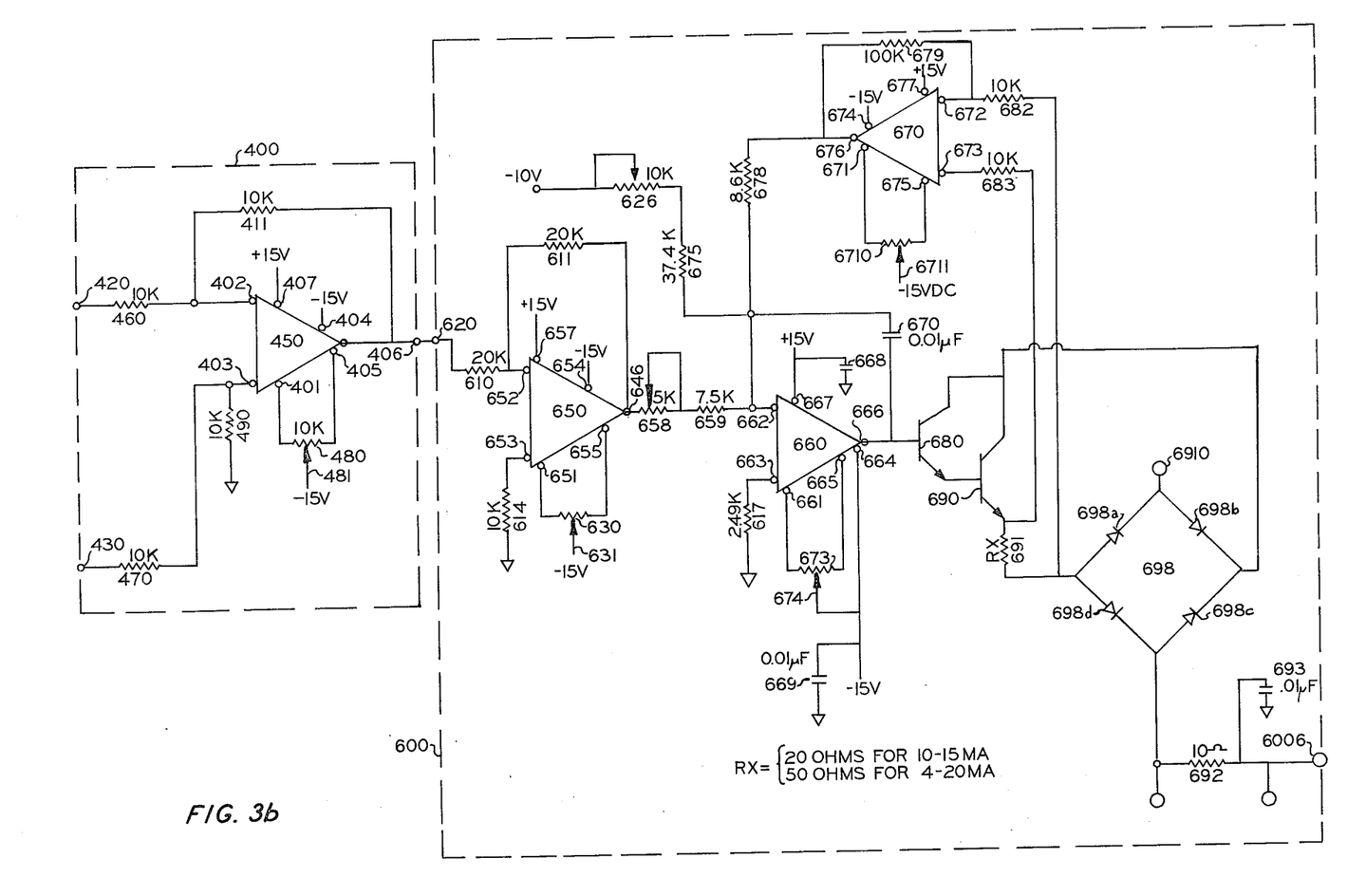

Referring now to FIGS. 3a and b, there is shown an analog circuit for the control system just described. In this drawing the sizes of the resistors and capacitors are shown. The letter $k$ is used for kiloohm, M is used for megaohm, mF is used for microfarad, V is used for volt, and $\mu$A is used for microampere.

The analog circuit shown in FIG. 3 consists essentially of six separate units, 200, 800, 400, 600, and 300 and 500. The input 220 of the multiuse amplifier 200 is connected to the output of a unit (not shown) which generates an electrical signal corresponding to the measurement of the disturbance variable at the uncontrolled first input 2 of the process 1 (see FIG. 1). The signal which is fed to the input 220 can be the output of a computer which has calculated this value from one or more process variables in order to generate a feedforward signal. The output 206 of the multiuse amplifier 200 is connected to the input 820 of the lead lag unit 800. This lead lag unit 800 produces the feedforward control signal referred to above. The output 806 of the lead lag unit 800 is connected to a first input 420 of a multiuse amplifier 400. The output 406 of this multiuse amplifier is connected to the input 620 of an output module 600, the output 6006 of which is connected to the actual controller, e.g., via an I/P converter, which in turn pneumatically adjusts the setpoint of a pneumatic valve controller. The output 6006 of this output module can also be connected to a commercially available controller, e.g., a Veritrak controller module 555 RC 1135 (Westinghouse Electric Corporation). The input 320 of a multiuse amplifier 300 is connected to a unit (12, FIG. 1) not shown in FIG. 3 which generates a feedback control signal, from e.g. a thermocouple. The output 306 of the multiuse amplifier 300 is connected to the input 520 of a proportional integral controller 500. The output 540 of this proportional integral controller 500 is connected to the second input 430 of the multiuse amplifier 400.

The multiuse amplifier 200 of FIG. 3 is explained in more detail in the following. The central unit of this multiuse amplifier 200 is an internally compensated operational amplifier 250. Such operational amplifiers are commercially available units, e.g. available under the trade name $\mu$A 741C from Fairchild Corporation. The inputs and outputs of the amplifier 250 have been given the same last digit as they are labeled in the Fairchild brochure describing this amplifier. Thus, input 202 is the inverting input (labeled 2 in the Fairchild brochure). This inverting input 202 of the operational amplifier 250 is connected with the input 220 of the multiuse amplifier 200 via a resistor 210. The inverting input 202 is also connected via the series combination of an adjustable feedback resistor 211 and a fixed feedback resistor 221 to the output 206 of the operational amplifier 250 which output is also the output of the multiuse amplifier 200. The adjustable feedback resistor 211 controls the amplification of the multiuse amplifier 200 so that the ratio of the output voltage to the input voltage is the same as the ratio of the feedback resistance (211 and 221 added) to the input resistance 210. In the present embodiment the amplification therefore can be adjusted between 2 and 3. The multiuse amplifier 200 also serves to isolate the input signal from the following circuits.

The inverting input 202 of the operational amplifier 250 is also connected via a high resistance 212 and an adjustable resistor 213 to a reference voltage of −10 V for zeroing the output signal.

The noninverting input 203 of the operational amplifier 250 is connected to ground via a resistor 214. The first offset null input 201 is connected via a potentiometer 230 with the second offset null input 205. The sliding contact 231 of the potentiometer 230 is connected to a −15 V voltage source. The function of this potentiometer 230 is a voltage offset null circuit, which means that the contact 231 is adjusted with the potential at the two inputs (inverting and noninverting) equal or zero, so that the output of the amplifier is zero. The power inputs 204 and 207 of the operational amplifier 250 are connected to −15 V DC and +15 V DC, respectively.

The multiuse amplifier 300 is practically identical to the multiuse amplifier 200. The inverting input 302 of an operational amplifier 350 is connected via a resistor 310 with the input 320 of the multiuse amplifier 300. The inverting input 302 is further connected via the series combination of a fixed resistor 321 and an adjustable resistor 311 to the output 306 of the operational amplifier. The inverting input 302 is further connected via the series combination of a fixed resistor 312 and an adjustable resistor 313 to the voltage source of −10 V DC. The noninverting input 303 of the operational amplifier 350 is connected via a resistor 314 to ground. The offset null inputs 301 and 305 are connected via a potentiometer 330 with each other. The sliding contact 331 of this potentiometer is connected to −15 V DC. The power inputs 304 and 307, respectively, of the operational amplifier 350 are connected to +15 V DC and −15 V DC, respectively.

The adjustable resistors 211 and 311, as well as 213 and 313, are adjusted such that the output voltage of the operational amplifier 206 or 306 is related to the voltage at the input 220 or 320, respectively, of the multiuse amplifier 200 or 300, respectively, by the equation $$e_o = \frac{R_f}{R_{in}} \cdot e_i$$

wherein $e_0$ = output voltage; $e_i$ = input voltage; $R_f = R_{211} + R_{221}$ and $R_{in} = R_{210}$ for amplifier 200, and $R_f = R_{311} + R_{321}$ and $R_{in} = R_{310}$ for amplifier 300. The output 206 of the multiuse amplifier 200 is connected to the input 820 of the lead lag unit 800. This lead lag unit 800 comprises an internally compensated operational amplifier 850, and in this particular case it is again the unit μA 741C commercially available from Fairchild Corporation. The inverting input 802 of this operational amplifier 850 is connected via the parallel combination of a resistor 808 and a capacitor 809 to the input 820 of the lead lag unit 800. Both the resistor 808 and the capacitor 809 can be and in this particular case are adjustable. The inverting input 802 of the operational amplifier 850 is further connected via the parallel combination of a feedback resistor 810 and feedback capacitor 812 to the output 806 of the operational amplifier. The feedback capacitor 812 and the feedback resistor 810 can be and in the shown case are adjustable. The noninverting input 803 of the operational amplifier 850 is connected via a resistor 814 to ground. The offset null input 801 is connected to the offset null 805 input via a potentiometer 830. The sliding contact 831 of this potentiometer 830 is connected to −15 V DC voltage source. The positive power input 807 is connected to +15 V DC and the negative power input 804 is connected to −15 V DC.

In order to understand the way the lead lag unit 800 functions, one starts from an ideal operational amplifier 850. Such an amplifier is characterized by the fact that there is no current flowing into either one of the inputs 802 and 803 and that the output resistance of the output of this operational amplifier is zero. Under these assumptions the following simple calculations can be made:

$$e_o(s) = -K \left( \frac{T_1 S + 1}{T_2 S + 1} \right) e_i(s)$$

$$e_o(s) T_2 S + e_o(s) = -K[T_1 S e_i(s) + e_i(s)]$$

$$T_2 \frac{de_o(t)}{dt} + e_o(t) = -K \left[ T_1 \frac{de_i(t)}{dt} + K e_i(t) \right]$$

wherein $$K = \frac{R_{810}}{R_{808}}$$

$$T_1 = R_{808} C_{809}$$

$$T_2 = R_{810} C_{812}.$$

Thus, the output voltage of the operational amplifier equals the sum of the input voltage plus the first derivative with the time of the input voltage multiplied by a constant and said sum multiplied by another constant. The assumption just made on the ideal behavior of the operational amplifier 850 and the results found based on this assumption are realistic only for slowly changing input signals at the input 820. This, however, is the case for most of the control problems which have to be solved in the chemical and physical processes.

The output 306 of the multiuse amplifier 300 is connected to the input 520 of the proportional integral controller 500. This proportional integral controller 500 comprises operational amplifiers 550, 560 and 570. Amplifier 570 is a summing amplifier which sums the proportional gain with the integral gain. The noninverting input 553 of the first operational amplifier 550 is connected via a resistor 5510 to the input 520 of the proportional integral controller 500. The noninverting input 553 is also connected via a resistor 5511 to ground. The inverting input 552 of the operational amplifier 550 is connected via a resistor 5520 to the output 546 of an operational amplifier 540. The inverting input 552 is also connected with the output 556 of the operational amplifier 550 via a resistor 5540. The offset null input 551 is connected to the offset null input 555 via a potentiometer 5530, the sliding contact 5531 of which is connected to −15 V DC. The power inputs 557 and 554 are connected to +15 V and −15 V DC, respectively. The operational amplifier 540 is circuited such as to constitute a unity gain voltage follower. Thus, the inverting input 542 is connected externally directly to the output 546 of the operational amplifier 540 whereas the noninverting input 543 is connected to a setpoint voltage source not shown in the drawing. The offset null input 541 and the offset null input 545 of the operational amplifier 540 are connected via a potentiometer 5430 the sliding contact 5431 of which is connected to −15 V DC. The power inputs 547 and 544 of the operational amplifier 540 are connected to +15 V and −15 V, respectively. The operational amplifier 540 thus has only the function of providing the setpoint voltage from the input 543 to the output 546 and at the same time isolating the output 546 from the input 543.

Since the input resistor 5520 for the setpoint voltage, the resistor 5510, the feedback resistor 5540, and the resistor 5511 which connects the non-inverting input 553 of the operational amplifier 550 to ground have the same size, the output signal at the output 556 is exactly the difference between the input signal 520 and the setpoint voltage applied to the input 543 of the operational amplifier 540.

The output 556 of the operational amplifier 550 is connected via a resistor 509 to the inverting input 562 of the operational amplifier 560. This inverting input 562 is connected by resistor 5642 to the sliding contact 5641 of a potentiometer 5640 which connects the output 566 of the operational amplifier 560 to ground via a resistor 5630 which is in series with the potentiometer 5640. The noninverting input 563 of the operational amplifier 560 is connected to ground via a resistor 5611. The offset null input 561 and the offset null input 565 are connected via a potentiometer 5630, the sliding contact 5631 of which is connected to −15 V DC. The power inputs 567 and 564 are connected to the +15 V DC and −15 V DC power sources, respectively.

The output 566 of the operational amplifier 560 is connected to ground via potentiometer 5670 to provide an input to the integrating circuit made up of transistors 5920, 5930, operational amplifier 580, and feedback condenser 5960. Thus, the output voltage of the operational amplifier 560 at 566 is the proportional gain as determined by the setting of potentiometer 5640 relative to the resistor 5642.

The output 566 of the operational amplifier 560 is also connected via a potentiometer 5670 to ground. This connection is parallel to the connection via the series combination of potentiometer 5640 and the resistor 5630. The sliding contact of potentiometer 5640 is connected via a resistor 5642 to the inverting input 562 of the operational amplifier 560. The sliding contact 5671 of the potentiometer 5670 is connected via a high resistor 5910 to the gate terminal of a first transistor 5920. The gate of a second transistor 5930 is connected to ground. The two transistors are junction field effect transistors (JFETs) connected in a differential arrangement. The two drain terminals are connected together and to +15 V DC via resistance 5940. The source terminals are connected together via the series combination of resistance 5921, potentiometer 5950 and resistor 5931. The contactor of potentiometer 5950 is connected to −15 V DC. The gate terminal of JFET 5930 is connected to ground while the gate terminal of JFET 5920 is connected to 566 through potentiometer 5670 and contactor 5671. The other end of potentiometer 5670 is grounded. The source terminal of transistor 5920 is connected to the inverting input 582 of an operational amplifier 580 ($\mu$A 741C, Fairchild Corporation). The gate terminal of the transistor 5920 is also connected via a condenser 5960 to the output of the operational amplifier 580 to perform integration. The two transistors 5920 and 5930 constitute a dual junction field effect transistor and, as explained, are connected in a differential arrangement. These transistors are commercially available under No. 2N3955 from Saltron Devices, Inc., San Diego, California. The voltage which is applied to the inverting input 582 and the voltage which is applied to the noninverting input 583 are the same in the case where the voltage at the gate of the transistor 5920 is the ground voltage. Thus, the operational amplifier 580 amplifies the difference between a constant voltage and a voltage proportional to the output voltage of the operational amplifier 560. The feedback condenser 5960 has the effect that the output voltage of the operational amplifier 560 is integrated by the operational amplifier 580 so that the output voltage at the output 586 is essentially the time integral of the output voltage at the output 566 of the operational amplifier 560. Time constant of this integrator is defined by the capacitance of capacitor 5960, the resistance of the resistor 5910 and the characteristics of the amplifier 580 as well as the respective resistors connected to the drain and source terminals of transistors 5920 and 5930.

The noninverting input 573 of the operational amplifier 570 is connected via the resistor 5710, a resistor 5720, and a resistor 5721 to the sliding contact 5741 of a potentiometer 5740. This potentiometer 5740 is connected between ground and +10 V DC. A switch 5790 is provided between the gate terminal of the transistor 5920 and the connecting point of the two resistors 5720 and 5721. By closing the switch 5790 the capacitor 5960 is discharged rapidly through the resistor 5720. Thereby the integrating circuit is reset and the integrating procedure can start again. The integrating feedback capacitor 5960 is thus operated at a starting voltage of zero. The output 566 of the operational amplifier 560 is connected via a resistor 569 to the inverting input 572 of the operational amplifier 570. The inverting input 572 is also connected via a feedback resistor 5760 to the output 576 of the operational amplifier 570. Again, the offset null 571 and the offset null input 575 are connected via a potentiometer 5730 with each other and the sliding contact 5731 of this potentiometer is connected to −15 V DC. The power inputs 577 and 574 are connected to +15 V and −15 V, respectively. Since the resistors 569 and 5760 have the same size and have the same size as the resistor 5710, the operational amplifier 570 provides an output signal which is the difference of the time integral of the output signal of the operational amplifier 560 and the output signal of operational amplifier 560 itself. Expressed as a formula, the output signal of the operational amplifier 570 is $$e_o = \frac{R_{5760}}{R_{569}} [e_{586} - e_{566}]$$

if $R_{5760} = R_{5761}$
and $R_{569} = R_{5710}$.

wherein $e_{586}$ is the output voltage of the operational amplifier 580, which is the inverted time integral of the output voltage $e_{566}$ of the operational amplifier 560.

The proportional integral controller 500 shown in FIG. 3a also has an indicator which shows the percentage of deviation of the input signal 520 from the setpoint which is connected to the input 543. This indicating unit consists essentially of a series of resistors 5001, 5002, 5003 and an adjustable resistor 5004 connected in series between the output 546 of the setpoint operational amplifier (which is the setpoint since the operational amplifier 540 is used as a voltage follower in this case) and the input 520 of the proportional integral controller. Between the resistor 5001 and 5002 a microampere meter is arranged. In addition, the slidable contact of the potentiometer 5004 is connected via a meter guard 5006 consisting of two diodes connected back to back which shorts out the meter in case of an overload across meter 5005. The slidable contact of the potentiometer 5004 is adjusted such that the microampere meter 5005 is reading zero at startup. Thus, the instrument 5005 shows the deviation of the voltage at the input 520 compared to the setpoint value 546.

The output 806 of the lead lag unit 800 is connected with the first input 420 of the multiuse amplifier 400, and the output 540 of the proportional integral controller 500 is connected to the second input 430 of the multiuse amplifier 400. This multiuse amplifier 400 comprises an operational amplifier 450 the inverting input of which is connected via a resistor 460 to the first input 420 of the multiuse amplifier 400, and the noninverting input 403 of which is connected via a resistor 470 to the second input 430 of the multiuse amplifier 400, The inverted input 402 is also connected via a resistor 411 to the output 406 of the operational amplifier 450, which at the same time is the output of the multiuse amplifier 400. Since the resistors 411, 460 and 470 all have the same size, the operational amplifier 450 is a unity gain amplifier which adds the two signals from the output 806 of the lead lag unit 800 and the output 540 of the proportional integral controller, so that the output of the multiuse amplifier 400 is given by the equation $$e_{406} = +\frac{R_{411}}{R_{460}} [e_{430} - e_{420}]$$

if $R_{411} = R_{490}$
and $R_{460} = R_{470}$.

As in all the other cases, the operational amplifier 450 can be a commercial unit, such as the μA 741C from Fairchild Corporation. The two offset null inputs 401 and 405 are connected via a potentiometer 480, the sliding contact 481 of which is connected to −15 V DC. The power inputs 407 and 404 are connected to +15 V and −15 V, respectively. The noninverting input 403 of the operational amplifier 450 is connected via a resistor 490 to ground.

The output 406 of the summing unit 400 is connected to the input 620 of an output circuit 600. This output circuit 600 consists essentially of a multiuse amplifier 650, the output 646 of which is connected to the input of an analog output circuit which is essentially the same as the one described in U.S. Pat. No. 3,644,752.

The multiuse amplifier 600 comprises operational amplifiers 650 and 660. The inverting input 652 of operational amplifier 650 is connected via a resistor 610 to the input 620 of the output unit 600. This inverting input 652 is connected via a feedback resistor 611 having the same size as the input resistor 610 to the output 646 of the operational amplifier 650. The noninverting input 653 of the operational amplifier 650 is connected via a resistor 614 to ground. The two offset null inputs 651 and 655 are connected to each other via a potentiometer 630, the sliding contact 631 of which is connected to −15 V DC. The power inputs 657 and 654 are connected to +15 V and −15 V, respectively.

The output 646 of the operational amplifier 650 thus contains the inverted signal of the output 406 of the multiuse amplifier 400. This output 646 is connected via a zero adjustable resistor 658 and a fixed resistor 659 to the inverting input 662 of an operational amplifier 660. This operational amplifier is a commercially available unit; in this case it is again unit μA 741C, Fairchild Corporation. This inverting input 662 is also connected via a feedback capacitor 670 to the output 666 of the operational amplifier 660. The noninverting input 663 of the operational amplifier 660 is connected via a resistor 617 to ground. The offset null inputs 661 and 665 are connected to each other via a potentiometer 673, the sliding contact 674 of which is connected to −15 V DC. The power input 667 is connected to +15 V and the power input 664 is connected to −15 V. Each of the power inputs is also connected via a capacitor 668 and 669, respectively, to ground.

The inverting input 662 is also connected via the series combination of a fixed resistor 675 and an adjustable resistor 626 to −10 V DC.

The output 666 of the operational amplifier 660 is connected to the base of a transistor 680. The emitter of this transistor 680 is connected to the base of a second transistor 690. The two collectors of the transistors 680 and 690 are connected with each other, thus forming a Darlington amplifier. The two collectors are also connected to a full wave rectifier network 698 comprising four diodes 698a, 698b, 698c and 698d. The two collectors are connected to the rectifier network between the two diodes 698b and 698c. The emitter of the transistor 690 is connected via a resistor 691 to the corner of the rectifier network 698 which is located diagonally opposite to the corner which is connected to collectors. Thus, the emitter of the transistor 690 is connected via the resistor 691 to the point of the rectifier network which is located between the two diodes 698a and 698d.

The diagonal corner of the rectifier network 698 which is located between the diodes 698a and 698b is to be connected to the voltage source 6910 which can be either positive or negative. The fourth corner of the rectifier network 698 which is located between the diodes 698d and 698c is connected via a resistor 692 to the output 6006 to which the load can be attached. The output 6006 is also connected via a capacitor 693 to ground. Precision 10 ohm resistor 692 can be used as a means for measuring by connecting a meter whereby the output signal can be indicated.

The two ends of the resistor 691 are connected via two resistors 682 and 683 to the inverting and noninverting inputs 672 and 673, respectively, of an operational amplifier 670. The offset null inputs 671 and 675 of this operational amplifier 670 are connected via a potentiometer 6710 with each other. The sliding contact 6711 of this potentiometer is connected to a voltage source of −15 V DC. The power inputs 677 and 674 of the operational amplifier 670 are connected to +15 V and −15 V, respectively. The output 676 of the operational amplifier 670 is connected via feedback resistor 679 to the inverting input 672 of the operational amplifier 670. The output 676 of the operational amplifier 670 is finally connected via a resistor 678 to the input 662 of the operational amplifier 660.

The resistor 691 can be 20 ohms for the case where the current at output 6006 is in the range of about 10 to about 50 mA, or 50 ohms for the case where the current of the load is in the range of about 4 to about 20 mA. Thus, the voltage drop across the resistor 691 in each instance is in the range of about 0.2 to about 1 V. The operational amplifier 670 amplifies the voltage drop across the resistor 691. This feedback stabilizes the operation of the circuit 600.

Instead of using the rectifier network 698 it would also be possible to attach the positive terminal of a DC voltage source to the connected collectors of the transistors 680 and 690, one connection point of the load being at the negative terminal of the DC voltage source and the other connection point of the load being at the second contact of the resistor 691. However, the rectifier network 698 has the advantage that either the positive or the negative terminal of the DC voltage source can be attached to the contact 6910 and the circuit will still work properly. Thus, the flow of current through the load can be reversed using the same circuit.

Figure 4:
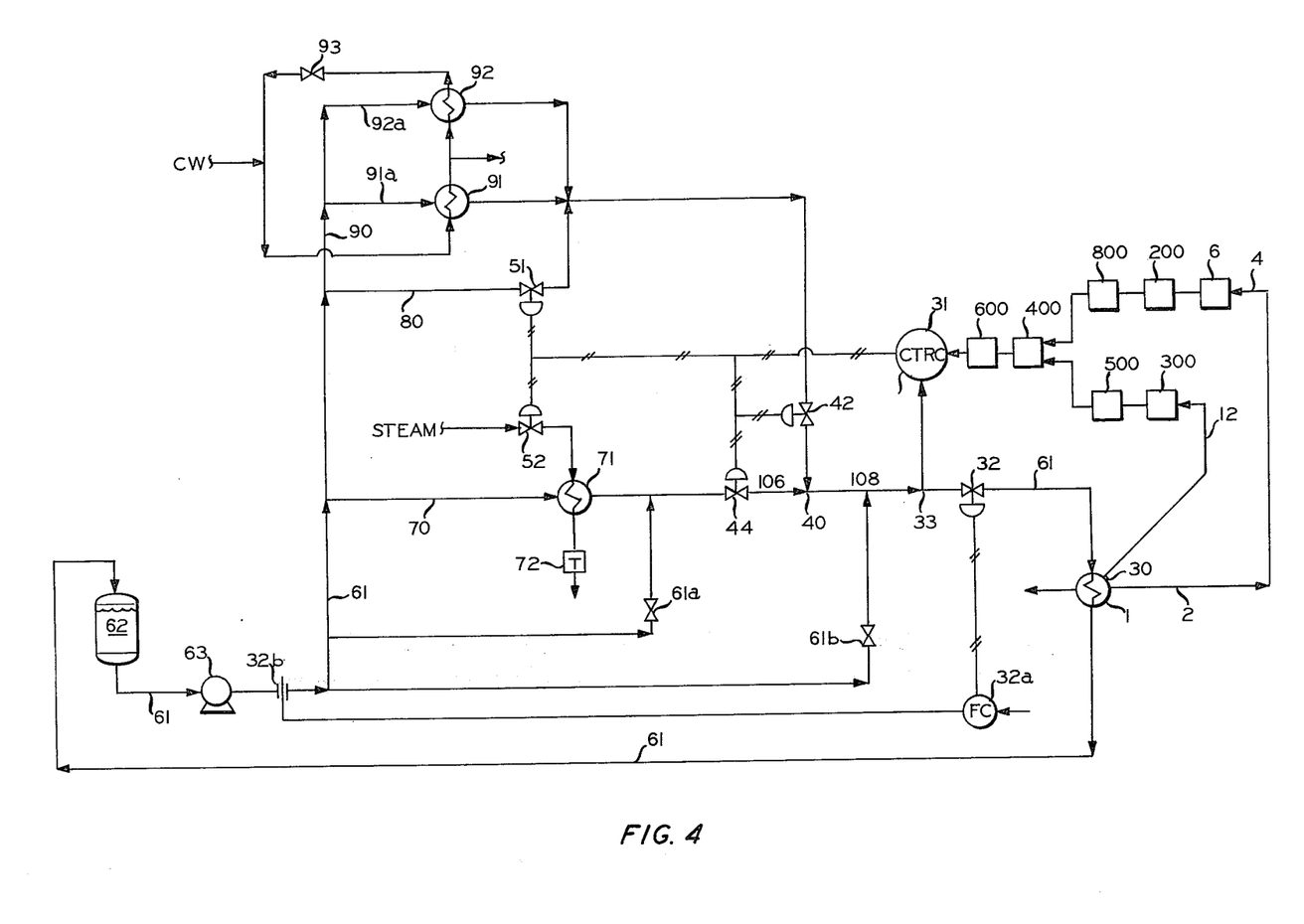
FIG. 4 shows a temperature control system for a polyethylene reactor.

FIG. 4 schematically shows the diagram for the temperature control of a polyethylene reactor 1. The temperature of this polyethylene reactor is to be kept at a constant value as closely as possible. The feed monomer flow rate of the polyethylene reactor 1 is measured at 4 and utilized by a computer 6 to produce a feedforward signal representative of the effect of the predicted production rate on the reactor temperature. This feedforward signal is introduced into a lead lag unit 800. This computer 6 can compute the feedforward signal from other input signals than the monomer feed flow rate signal; but, for the sake of simplicity, it is assumed that feedforward signal stems essentially from the monomer feed flow rate as measured. This feedforward signal is converted as described in connection with FIGS. 3a and 3b by multiuse amplifier 200 and a lead lag unit 800.

Feedback signal is furnished from a thermocouple 12. This feedback signal representing the temperature or the parameter to be controlled is converted into an analog electrical signal in the multiuse amplifier 300 and in the following proportional integral controller 500 as described in connection with FIGS. 3a and 3b. Both signals are added in the multiuse amplifier 400 and the resulting signal is converted to a final analog electrical output signal in the output control circuit 600. The output signal at the output of the output circuit 600 constitutes the setpoint of a temperature controller 31. This temperature controller 31 compares the temperature of the water stream entering the shell of the reactor 1 via valve 32. The temperature of the water, the flow of which is controlled by the valve 32, is sensed at 33 and the sensed value is furnished as the control signal to the temperature controller 31. The temperature controller 31 furnishes a control signal to two pairs of valves, namely, two valves 44 and 42 and also to two valves 51 and 52. The actuating mechanisms of the valves 44, 42 and 51, 52 are arranged in such a manner with respect to controller 31 that a control signal coming from the temperature controller 31 indicating a lower temperature at the check point 33, as compared to the setpoint delivered by the electronic control system, further opens valve 44 and further closes valve 42, and at the same time further opens both valve 51 and valve 52. In the opposite situation, i.e., when the control signal delivered by the temperature controller 31 is such that the temperature at the control point 33 is higher than the setpoint calculated by the electronic device described, this signal further closes valve 44, further opens valve 42 and further closes both valves 51 and 52.

The cooling water flowing through the reactor 1 via the main line 61 is withdrawn from a heat-insulated tank 62 by means of a pump 63. The main line 61 splits into a heating line 70, a bypass line 80 in which said water is neither essentially cooled nor essentially heated and a cooling line 90 which guides the water to a cooling stage.

The water flowing through the heating line 70 flows through an indirect heat exchanger 71 which is connected to a steam source, not shown in the drawing, via valve 52. The steam leaving the heat exchanger 71 is moved through a trap 72 in which condensed steam is collected and vented.

The flow rate of the bypass water flowing through line 80 is controlled by valve 51. Thus, valve 51 controls also the portion of water that is flowing through cooling branch 90. The further valve 51 is opened, the more water flows through the bypass line and the less water flows through the cooling heat exchangers 91 and 92 through which cold water from a source not shown is circulated. The cooling water stream 90 is split into a stream 91a and 92a flowing through the indirect heat exchangers 91 and 92, respectively. While stream 91a is always cooled, the cooling water having a temperature of 94° F. (35° C.) and flowing through the indirect heat exchanger 92 can be shut off by a valve 93 which is normally open.

Since valves 51 and 44 and 42 influence the overall flow rate of water through the main line 61, there is provided a flow control valve 32 which is operated by a flow controller unit 32a. This flow controller unit 32a receives a signal from a flow meter 32b and opens or closes 32 such as to keep the flow rate of the water leaving the pump 63 constant. Thus, the flow rate of the water through reactor 1 is constant.

Two bypass valves 61a and 61b are provided for. Bypass valve 61a is normally open and bypass valve 61b is normally closed.

The cooling water CW flowing through the heat exchangers 91 and 92, the heat exchanger 92 having half the size of the heat exchanger 91, has a temperature of 94° F. (35° C.). The cooling water flows at a rate of 640 gallons per minute and the heat transfer in the two heat exchangers is 230,000 BTU per minute. The water leaving the pump 63 is at a temperature of less than 211° F. and is cooled to about 190° F. while passing through the heat exchangers 91 and 92. The flow rate of water through valve 42 at steady state conditions is 1180 gallons per minute. Valve 61a allows 800 gallons of water per minute at a temperature less than 211° F. to flow. The flow rate of steam through the heat exchanger 71 is 34 pounds per hour at 23 psia with the rate of heat exchanger being 35,000 BTU per minute, again under steady state conditions. 612 Gallons of water per minute flow through heat exchanger 71 at steady state conditions. The water from line 70 leaving the heat exchanger 71 is heated to a temperature of 220° F. The pressure of the water upstream of valve 42 is about 157 psig and the pressure of the water at the mixing point of 40 between the cold water and the warm water is about 150 psig. The water entering the shell of the reactor 1 is at a temperature of 202° F. and flows at a rate of 2605 gallons per minute. Under steady state conditions the water passing through the reactor is heated at a rate of 205,000 BTU per minute, the temperature of the water thus rising to 211° F. due to the fact that the ethylene process in the reactor 1 is an exothermic process.

The coolant temperature controller 31 is a Veritrack 3-Mode controller, Model 555RC1135, commercially available from Westinghouse Electric Corporation. The orifice meter 32b is a commercially available orifice meter sold by Foxboro and described in the bulletin 351 as an orifice meter. Flow controller 32a is a Veritrak controller instrument sold by Westinghouse Electric Corporation.

EXAMPLE I

A process having a disturbance input with a disturbance dynamics and a control input with a control dynamics was simulated in an electronic simulating unit. The simulating unit comprised an analog simulating computer (EAI TR-10 Analog Simulating Computer) and two amplifiers for dead time simulation (Burr-Brown Sample/Hold). One of these amplifiers was connected to the output of the disturbance dynamics process simulation which was carried out by the simulating computer using a disturbance input generated by a variable frequency function generator (Beckmann 9010). The other dead time simulating amplifier was connected to control dynamics simulation carried out by the simulating computer using a control input which was generated by a digital computer (Interdata Mod. 4) based on (a) the disturbance function generated by the variable frequency function generator converted into digital data by an AD converter (Raytherm MADC-10) and (b) the control function of this invention with two dead times and two time constants that can be varied from a separate terminal (Teletype result of ASR-33 terminal). The result of the digital computer computation was introduced via a DA converter (Raytherm MDAC-10) into the analog simulating computer as the control input. This control input and the sum of the disturbance dynamics signal and the process dynamics signal calculated by the analog simulating computer were displayed on a recorder (Gulton Techni Rite TR-888 strip chart recorder).

The process dynamics simulated by this unit can be expressed as a transform function made of two first order lags and two dead times both in the control and in the disturbance. The experiment and results reported here were limited to cases where one time constant of the control dynamics was equal to one time constant of the disturbance dynamics. This limitation did, of course, not limit the process simulation to first order lags in the control and disturbance dynamics since the operators involved include differentiators. However, the limitation reduced the issue to the practically occurring dynamics as defined earlier by the smooth curve of the process parameter having one inflection point as a response to the disturbance step changes and control step changes.

The computer output showed on the display the process parameter as a result of the disturbance input and the control input calculated from this disturbance input. The control input was calculated from the disturbance input in the beginning of the experiment arbitrarily from a set of time constants $T_1$ and $T_2$.

Then the values $T_1$ and $T_2$ were changed randomly from the separate terminal mentioned above in a trial-and-error method. This change was repeated several times until the response at the output of the display of the simulating unit was minimal or, in other words, until the control of the process achievable with this function mentioned earlier was at an optimum.

This procedure was repeated for different sets of the four time constants of the simulating unit $T_{c1}$, $T_{c2}$, $T_{d1}$, $T_{d2}$ mentioned above. The results of optimum time constants for these various different simulated processes are shown in the following Table I.

TABLE I

| Run No. | $T_c$ | $T_d$ | $T_c/T_d$ | $T_1$ | $T_2$ | $T_1/T_2$ |
|---|---|---|---|---|---|---|
| 1 | 25 | 20 | 1.25 | 10 | 4 | 2.5 |
| 2 | 25 | 14 | 1.6 | 20 | 1 | 20 |
| 3 | 22 | 25 | 0.88 | 6 | 11 | 0.5 |
| 4 | 22 | 14 | 1.5 | 10 | 2 | 5 |
| 5 | 22 | 10 | 2.2 | 15 | 1 | 15 |
| 6 | 14 | 25 | 0.56 | 1 | 10 | 0.1 |
| 7 | 17 | 25 | 0.68 | 2 | 10 | 0.2 |

Figure 5:
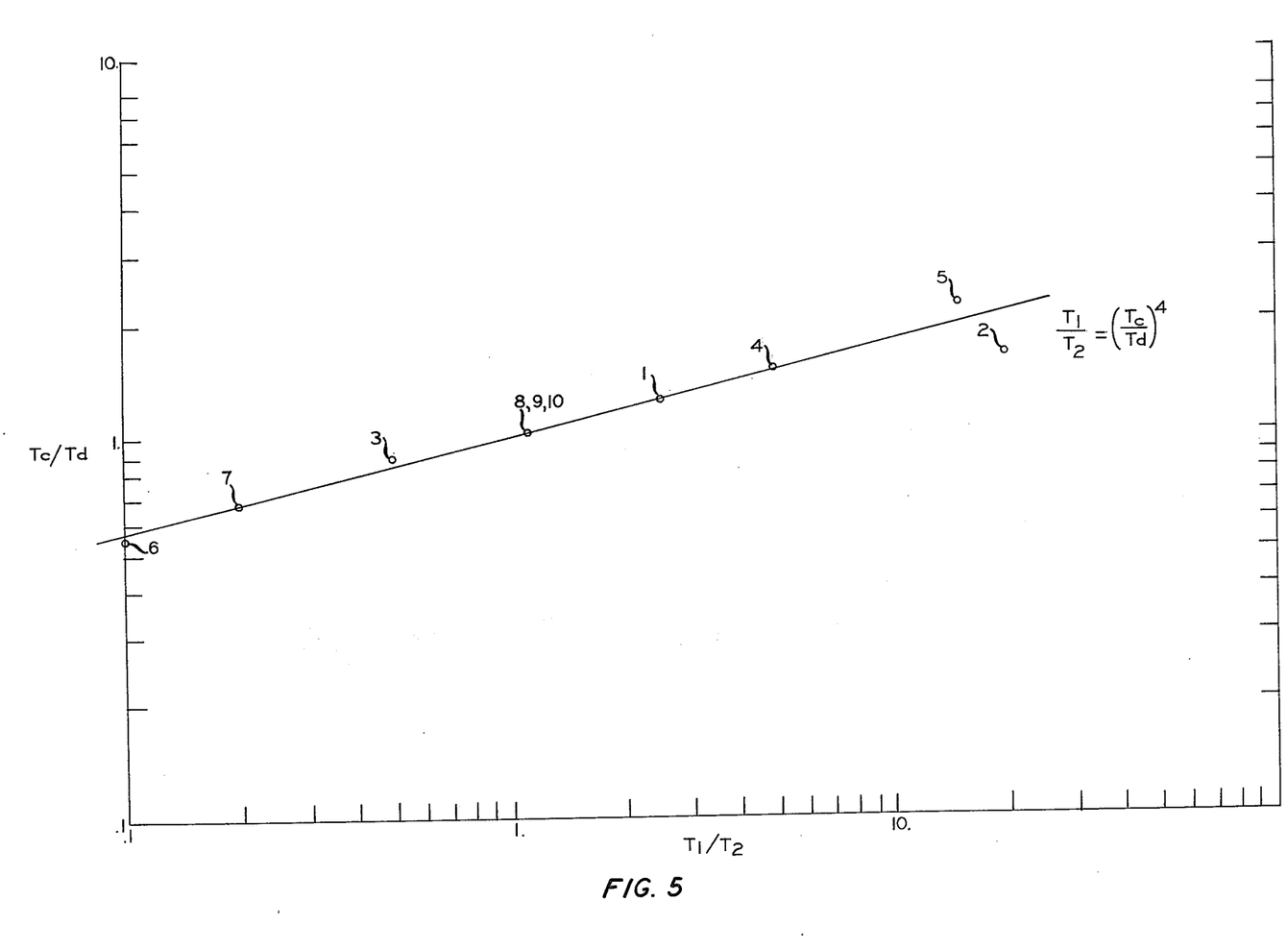
FIG. 5 shows a double logarithmic diagram with the results obtained in the example.

The ratios of the optimized time constants $T_1$ and $T_2$ in the control system and the ratios of the respective time constants for the disturbance dynamics and for the control dynamics which were different were plotted thereafter in a double logarithmic scale. These values are shown in FIG. 5. As can be seen from this Figure, a relationship between these time constants exists which is approximately $$\frac{T_1}{T_2} = \left(\frac{T_c}{T_d}\right)^4$$

This surprising result is independent of the disturbance dynamics and the control dynamics as such.

EXAMPLE II

In this second example essentially the same operation was carried out as described above in connection with Example I. However, this time all the four time constants, namely, the two control dynamics time constants and the two disturbance dynamics time constants, were made the same whereas the two dead times of the disturbance dynamics and of the control dynamics were different. Again, an optimization by trial and error was carried out to determine the optimum values for $T_1$ and $T_2$ in the control method. Surprisingly, it was found that although different dynamics this time were involved, the same relationship between the time constants $T_1$ and $T_2$ existed as before. In other words, in this case the two time constants $T_1$ and $T_2$ were the same so that the same fourth power relationship could be established.

This operation was repeated three times with three different sets of dead times as shown in the following Table II, runs 8–10. In all cases the respective time constants $T_1$ and $T_2$ were the same and had the same size as the time constants of the control dynamics and the disturbance dynamics.

TABLE II

| Run No. | $T_c$ | $T_d$ | $T_c/T_d$ | $T_1$ | $T_2$ | $T_1/T_2$ | $D_c$ | $D_d$ |
|---|---|---|---|---|---|---|---|---|
| 8 | 25 | 25 | 1 | 25 | 25 | 1 | 2 | 4 |
| 9 | 25 | 25 | 1 | 25 | 25 | 1 | 4 | 8 |
| 10 | 25 | 25 | 1 | 25 | 25 | 1 | 5 | 10 |

Figure 6:
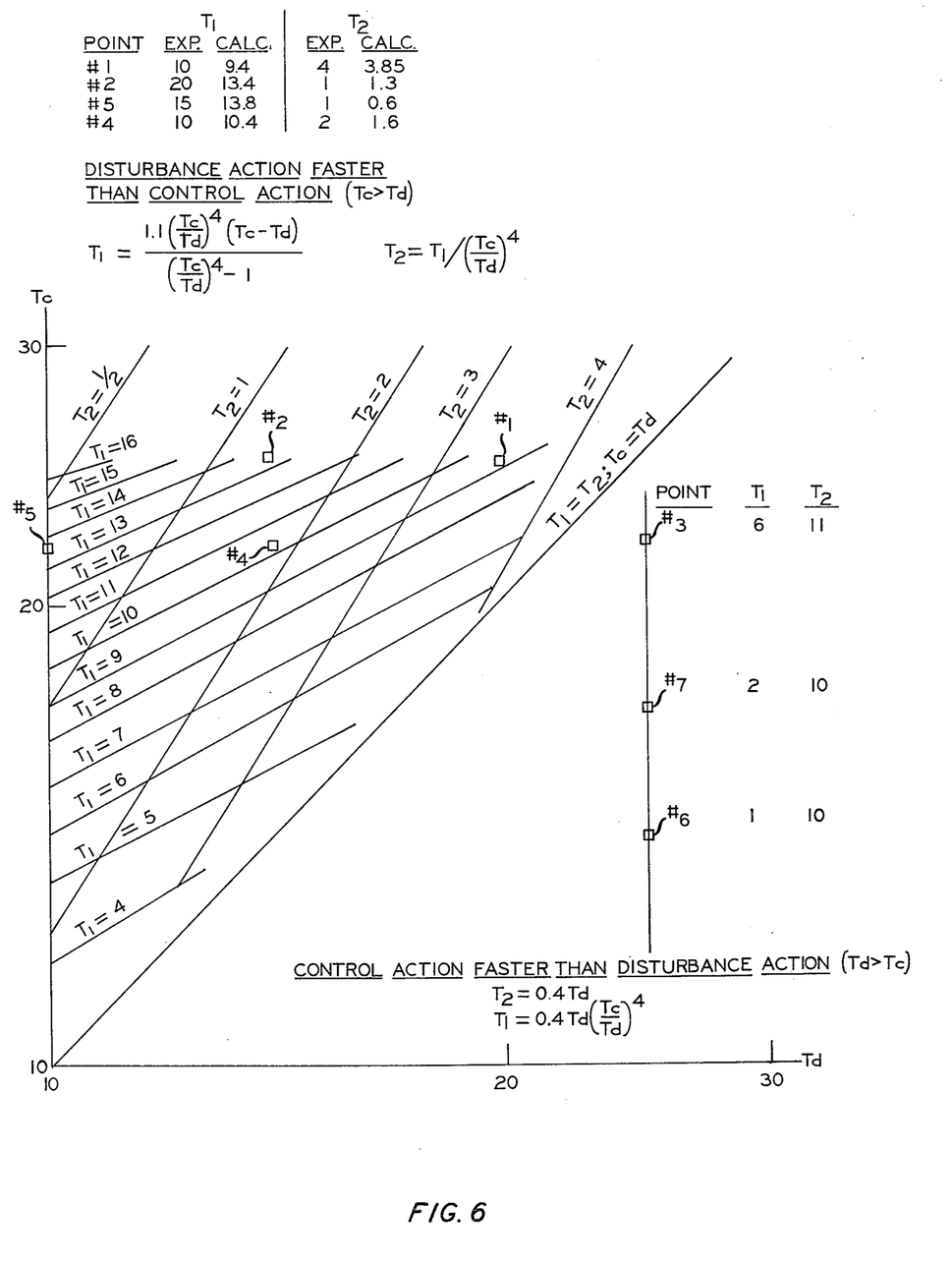
FIG. 6 shows a diagram to illustrate the relation between the time constants.

To further illustrate the invention reference is made to FIG. 6. This Figure shows a double logarithmic diagram with the disturbance and control dynamics points used as well as an illustration of how to determine the lead and lag time constants from these data. In the case where the control action is faster than the disturbance action, the relationship between the time constants is apparently $T_2 = 0.4T_d$; from this relationship in connection with the fourth power relationship between the time constant ratios shown in FIG. 5, the values for $T_1$ and $T_2$ can be calculated. For the case where the control action is slower than the disturbance action, the relationship between the time constants is somewhat more complicated. In the upper half of the diagram of FIG. 6 a series of parallel lines for the values of $T_1$ and another series of parallel lines for the values of $T_2$ are drawn. For a given process with the control and disturbance dynamics time constants $T_c$ and $T_d$, a point in the upper half of the diagram is defined. The corresponding values for $T_2$ and $T_1$ are read from the location of this point in the system of intersecting lines described. Thus, point number 7 with $T_d = 14$ and $T_c = 22$ is located in the diagram at $T_1 = 10.4$ and $T_2 = 1.6$. It is presently believed that in determining point number 2 a mistake was made that caused this point to be not in conformity with the values calculated from the formulae given above.

Reasonable variations and modifications which will be apparent to those skilled in the art can be made in this invention without departing from the spirit and scope thereof.

I claim:
1. A method to control a process wherein at least one parameter of the process is influenced by a disturbance variable and by a manipulated variable which control method comprises:
   a. automatically measuring said disturbance variable,
   b. automatically generating a disturbance signal $ds$ as a function of time corresponding to said disturbance variable as measured,
   c. converting said disturbance signal $ds$ in a computer into a feedforward signal $cs$ which is related to the disturbance signal $ds$ by the control equation

$$cs(L) = \frac{K_1}{K_2} \cdot \frac{T_2 \cdot L + 1}{T_1 \cdot L + 1} \cdot e - (D_d - D_c) \cdot L \cdot ds$$

wherein $K_1$ is the steady state gain of the process parameter caused by the unit change of the disturbance variable, $K_2$ is the steady state gain of process parameter caused by the unit change of the control variable, $D_d$ is the dead time of the disturbance dynamics, $D_c$ is the dead time of the control dynamics, L is the Laplace transform operator, $T_1$ and $T_2$ are defined by the following relation with $T_c$ and $T_d$:

1) if $T_d > T_c$, $$T_2 = 0.4 T_d,$$

$$T_1 = 0.4 T_d \cdot \left(\frac{T_c}{T_d}\right)^4,$$

2) if $T_c > T_d$, $$T_2 = \frac{1.1 (T_c - T_d)}{\left(\frac{T_c}{T_d}\right)^4 - 1},$$

$$T_1 = \frac{1.1 \left(\frac{T_c}{T_d}\right)^4 (T_c - T_d)}{\left(\frac{T_c}{T_d}\right)^4 - 1}$$

3) If $T_c = T_d$, $$T_1 = T_2 = T_c = T_d$$

wherein $T_c$ is the time constant of the control dynamics and $T_d$ is the time constant of the disturbance dynamics, with the further provision that either $T_c = t_d$ or $D_d = d_c$;

d. automatically converting said feedforward signal cs into a corresponding control signal, and e. utilizing said control signal to adjust said manipulated variable.

2. A method in accordance with claim 1 wherein said measured disturbance variable is converted into an electrical disturbance signal and wherein this electrical disturbance signal is smoothed and thereafter converted into said feedforward signal.

3. A method in accordance with claim 2 wherein said electrical disturbance signal is passed through an electrical filter to remove all components above an upper limit frequency therefrom.

4. A method in accordance with claim 1 wherein said disturbance signal is essentially a direct current electrical signal, wherein said electrical disturbance signal is passed via the parallel combination of an input resistor having the resistance $R_i$ and a capacitor having the capacitance $C_i$ to the inverting input of an operational amplifier, the output of which is connected to the inverting input of said operational amplifier via the parallel combination of a feedback resistor having the resistance $R_b$ and a capacitor having the capacitance $C_b$, resulting in an output signal at the output of the operational amplifier which is essentially said feedforward signal, the resistances and capacitances being such as to comply with the equations $$R_i C_i = T_2$$

$$R_b C_b = T_1$$

$$\frac{R_i}{R_b} = \frac{K_1}{K_2}.$$

5. A method in accordance with claim 1 wherein said parameter of said process is measured and a feedback signal is generated in accordance with this measured parameter, wherein said feedback signal and said feedforward signal are automatically linearly combined such as to produce said control signal.

* * * * *

UNITED STATES PATENT AND TRADEMARK OFFICE
CERTIFICATE OF CORRECTION

PATENT NO. : 4,006,346
DATED : February 1, 1977
INVENTOR(S) : Troy J. Pemberton

It is certified that error appears in the above-identified patent and that said Letters Patent are hereby corrected as shown below:

Claim 1, line 10, please change the formula $$"cs(L) = \frac{K_1}{K_2} \cdot \frac{T_2 \cdot L + 1}{T_1 \cdot L + 1} \cdot e-(D_d-D_c).L.ds"$$ to read $$--- cs = \frac{K_1}{K_2} \cdot \frac{T_2 \cdot L+1}{T_1 \cdot L+1} \cdot e^{-(D_d-D_c).L} .ds ---$$

Column 20, line 1, please change the formula $$"T_c = t_d \text{ or } D_d = d_c"$$ to read $$--- T_c = T_d \text{ or } D_d = D_c ---$$

Signed and Sealed this

Twelfth Day of April 1977

[SEAL]

Attest:

RUTH C. MASON
*Attesting Officer*

C. MARSHALL DANN
*Commissioner of Patents and Trademarks*